United States Patent Office 3,433,814
Patented Mar. 18, 1969

3,433,814
METHOD FOR PRODUCING INOKOSTERONE
AND ISO-INOKOSTERONE
Tsunematsu Takemoto, Sendai, and Shuntaro Ogawa and Nobushige Nishimoto, Osaka, Japan, assignors to Rohto Pharmaceutical Co., Ltd., Osaka, and Tsunematsu Takemoto, Sendai, Japan
No Drawing. Filed Apr. 25, 1967, Ser. No. 633,395
Claims priority, application Japan, Oct. 19, 1966, 41/69,106
U.S. Cl. 260—397.25    14 Claims
Int. Cl. C07c 167/40, 169/00; A01n 9/24

ABSTRACT OF THE DISCLOSURE

Inokosterone and isoinokosterone are obtained by solvent extraction from plants of the Amaranthaceae family, and more especially from the Achyranthes and Cyathula genuses.

---

This invention relates to a method of producing inokosterone and/or iso-inokosterone.

Ecdysone isolated from pupae of silkworms (*Bombyx mori*) by Butenandt et al. (A. Butenandt and P. Karlson; Zeitschrift für Naturforschung 9b, 389 (1954)), is the first of insect metamorphosis hormones (omulting hormone). Then, in 1966, 20-hydroxy ecdysone and ecdysterone which are reported to be more patent in the insect metamorphotic activity than acdysone were isolated also from pupae of *Bombyx mori* by Hocks et al. (P. Hocks and R. Wiechert; Tetrahedron Letters, No. 26, pp. 2989–2993, 1966) and Hoffmeister et al. (H. Hoffmeister and H. F. Grützmacher; Tetrahedron Letters, No. 33, pp. 4017–4023, 1966) respectively. Further, the isolation of crustecdysone from seawater crayfish (*Jasus lalandii*) and saturniid oak-silk moth (*Antherea pernyi*) has been reported (F. Hampshire and D. H. S. Horn, Chem. Comm., 37 (1966), and D. H. S. Horn, E. J. Middleton and J. A. Wanderlich, Chem. Comm., 339 (1966)).

These compounds are active as moulting or metamorphosis hormones of insects and accordingly are valuable substances. However, according to conventional methods, these insect moulting hormones can be obtained only in an extremely small amount from a huge amount of the expensive materials. For example, the yields of these hormones from the respective materials by the conventional methods are as follows:

| Hormone | Material | Yield (percent) |
|---|---|---|
| Ecdysone | Bombyx mori pupae | $7.36 \times 10^{-6}$ |
| Ecdysterone | do | $9 \times 10^{-7}$ |
| 20-hydroxyecdysone | do | $1.79 \times 10^{-6}$ |
| Crustecdysone | Sea-water crayfish | $2 \times 10^{-7}$ |

Thus, for example, only about 250 mg. of ecdysone can be isolated from 1 ton of *Bombyx mori* pupae and only about 9 mg. of ecdysterone can be obtained from 1 ton of *Bombyx mori* pupae.

It has been proposed to synthesize acdysone from ergosterol. However, this method involves very complicated 14 stage chemical reactions and yet the yield is very low.

Therefore, these hormones are extremely expensive and have not been used extensively in spite of their usefulness.

We have found that plants belonging to the tribes such as Achyrantes and Cyathula, etc. of Amaranthaceae family contain a relatively large amount of certain insect moulting or metamorphosis hormones, i.e., inokosterone and iso-inokosterone (ecdysterone).

We have also found that these hormones can readily be isolated from the above mentioned plants.

Thus, the present invention provides a novel method of producing inokosterone and/or iso-inokosterone by extracting them with a solvent from a plant belonging to Amaranthaceae family and recovering the hormones from the extract.

In carrying out the method of this invention any plant belonging to the family of Amaranthaceae which contains inokosterone and iso-inokosterone may be used, although those belonging to Achyrantes and Cyathula tribes of Amaranthaceae family are preferable. Examples of plants belonging to these preferred tribes are *Achyrantes fauriei*, *Achyranthes longifolia*, *Achyrantes japonica*, *Achyranthes bidentata*, *Achydranthes aspera*, *Achyranthes obutusifolia*, *Achyranthes rubrofusca*, *Cyathula capitata*, *Cyathula tomentosa*, etc. Any portion (aphyllous, stalk, radix, etc.) of these plants may be used. However, radices (e.g. *Achyranthis radix*, *Cyathula radix*) are most preferable because of their commercial availability and their higher contents of the desired hormones.

These plants may be subjected to the extraction in any suitable form. Usually, the herborized plant is cleansed with water, dried and chopped into small pieces or divided into fine particles or powder before subjecting to the extraction. If desired the plant may be raw or processed one which has been subjected to a physical, chemical or biological treatment before being subjected to the extraction.

These plants are annual herbs which grow throughout Japan, China and many other parts of the world, and therefore they are readily available in large amount and cheap.

According to this invention, inokosterone and iso-inokosterone are extracted from these materials with a suitable solvent. Various solvents may be used for this purpose. However, the use of inorganic solvents (e.g. water, salt solution, buffered solution, etc.) or organic solvents (e.g. methanol, ethanol, butanol, ethyl acetate, butyl acetate, etc.) or a mixture of two or more of them is preferable.

The amount of the extracting solvent with respect to the plant material may vary over a wide range. Generally, amount 1 to 40 parts (preferably 2–10 parts) by weight of the extracting solvent may be used per part of the plant material.

The extraction may be conducted in any suitable manner. Most typically, the plant material is immersed in the extracting solvent. The temperature of the extraction may be varied over a wide range, e.g. from the room or ordinary temperature (about 20–25° C.) to the boiling point of the particular solvent used. The extraction is conducted for a time sufficient to effect the desired extraction, the time being varied (e.g. 1 hour to 20 hours) depending upon the particular temperature and kind of solvent involved.

In the above manner, inokosterone and iso-inokosterone in the plant material are extracted into the solvent.

From the extract inokosterone and iso-inokosterone may be purified and isolated by means of ion-exchanger treatment and/or repeated extraction with solvent and non-solvent for the desired compounds.

Since inokosterone and iso-inokosterone are readily soluble in methyl alcohol, ethyl alcohol, pyridine, etc., hardly soluble in water, ethyl acetate, butyl acetate, ether, etc., and insoluble in petroleum benzine, benzene, hexane, etc. Therefore, by suitably combined and repeated use of these medium as extracting or washing medium, the desired compounds can be purified and crystallized. Techniques of this kind are well known in the art for the isolation of a compound from its solution.

When an aqueous extracting medium is used, the resulting aqueous extract is preferable to be treated with strong acidic cation exchange resin and/or strong basic anion exchange resin to remove basic and/or acidic impurities and to obtain a neutral aqueous solution containing the desired compounds.

When an organic extracting medium is used, the desired compounds are preferable to be transferred from the organic extract to an aqueous medium.

The aqueous solution obtained in the above manner may be subjected to extraction with a solvent such as esters (e.g. ethyl acetate, butyl acetate, etc.), higher alcohols (e.g. butyl alcohol, amyl alcohol, etc.) which are relatively immiscible with water. By distilling off the solvent, crude crystals may be obtained.

The crude crystals may further be purified by repeated recrystallization from water or a mixture of nonpolar-solvent (e.g. hexane, benzene, ether, petroleum benzine, etc.) and polar solvent (e.g. ethyl alcohol, methyl alcohol, etc.). In this manner, pure crystals of inokosterone and iso-inokosterone can be prepared. Separation of inokosterone and iso-inokosterone may be effected by utilizing difference of solubility. Inokosterone is more insoluble than iso-inokosterone.

Alternatively, the crude crystals may be acetylated. Since inokosterone forms tetraacetate, while iso-inokosterone forms triacetate, they can be isolated by a chromatographic treatment. The separated acetates are separately hydrolyzed to obtain free inokosterone and iso-inokosterone respectively.

The invention will be explained in more details by referring to the following examples. However, it should be understood that these examples are given for illustration purpose only and not for limitation of the invention in any way.

EXAMPLE 1

Radix of *Achyranthes fauriei* was cleansed with water and air-dried. The dried *Achyranthis radix* was chopped into small pieces. Fifteen kilograms of this material were extracted three times with methanol. At each extraction, the material was dipped in 20 liters of methanol and refluxed for 4 hours. The extract was concentrated in vacuo to 2 liters and precipitates (consisting mainly of $KNO_3$) formed were separated by filtration. The filtrate was mixed with 2 liters of water and was extracted three times with ether (total 500 ml.). The aqueous layer was separated and repeatedly extracted with ethyl acetate (total 40 liters). The extract was distilled to remove ethyl acetate so that crude crystals were precipitated in the residue and recovered by filtration. The filtrate was adsorbed on a column of alumina (200 g.) and was eluted with an ethyl acetate-ethyl alcohol (8:2) mixture. The effluent was concentrated in vacuo to precipitate crude crystals.

These crude crystals were combined and washed with 20 ml. ethyl acetate and then dissolved in 130 ml. ethyl alcohol. Upon addition of 300 ml. petroleum benzine, there were precipitated crude crystals (4.7 g.) of inokosterone and iso-inokosterone. The crude crystals were repeatedly recrystallized from an ethyl alcohol-petroleum benzine (2:8) mixture until pure colorless, needle crystals of inokosterone, M.P. 255° C. (decomp.) were obtained. Yield 0.75 g. Soluble in methyl alcohol, ethyl alcohol and pyridine; hardly soluble in water, ethyl acetate and ether; insoluble in benzene and petroleum benzine.

$C_{27}H_{44}O_7 \cdot \frac{1}{2}H_2O$: Theoretical: C, 66.23; H, 9.26. Found: C, 66.09; H, 9.29.

From the filtrate from inokosterone, there were obtained colorless needle crystals of iso-inokosterone. Yield 0.75 g., M.P. 242° C. (decomp.). Soluble in methyl alcohol, ethyl alcohol and pyridine; hardly soluble in water, ethyl acetate and ether; insoluble in benzene and petroleum benzine.

$C_{27}H_{44}O_7$: Theoretical: C, 67.47; H, 9.23. Found: C, 66.09; H, 9.29.

Inokosterone and iso-inokosterone thus obtained were both positive in all of Lieberman-Burchard reaction, Salcowski reaction and Tchugajeff reaction.

EXAMPLE 2

This example illustrates another procedure to purify and separate inokosterone and iso-inokosterone.

Four grams of crude crystals of a mixture of inokosterone and iso-inokosterone obtained by the same manner as in Example 1 were dissolved in 20 ml. of pyridine. To the resulting solution were added 40 ml. of acetic anhydride and the mixture was left to stand overnight at ordinary temperature (20–25° C.). Then the mixture was poured into 200 ml. of ice water to precipitate acetylated products (3.8 g.), which were recovered by filtration. The recovered product was dissolved in 50 ml. of an ethyl acetate-petroleum benzine (1:1) mixture and the solution was adsorbed on an upper portion of a column of alumina (250 g.). Then the column was subjected to elution with 1.5 liters of a mixture (1:1) of petroleum benzine and ethyl acetate. The effluent was distilled to remove the solvent and the residue was repeatedly recrystallized from dilute ethyl alcohol to obtain colorless needle crystals of inokosterone tetraacetate. Yield 1.3 g., M.P. 165–168° C. The same column was subjected to another elution with a mixture (8:2) of ethyl acetate and petroleum benzine. The effluent was distilled to remove the solvent and the residue was repeatedly recrystallized from a mixture (2:8) of ethyl acetate and hexane to obtain colorless needle crystals of iso-inokosterone triacetate. Yield 1.5 g., M.P. 193–195° C.

One gram of inokosterone tetraacetate thus obtained was dissolved in 100 ml. ethyl alcohol, and 10 ml. of 10% KOH were added thereto. The mixture was heated on a hot water bath for 1 hour. After cooling to room temperature, the solution was passed through a layer (30 mg.) of a cation-exchange resin, i.e. Ambertite IR–120 (H type) and the resin layer was washed with 100 ml. of 50% ethyl alcohol. The passed solution and washing liquid were combined and concentrated in vacuo. The formed precipitate was subjected to repeated recrystallization from an ethyl alcohol-hexane mixture (2:8) to obtain colorless needle crystals of inokosterone. Yield 0.6 g., M.P. 255° C. (decomp).

One gram of iso-inokosterone was dissolved in ethyl alcohol and hydrolyzed with KOH and after-treated in the same manner just mentioned in the preceding paragraph to obtain colorless needle crystals of iso-inokosterone. Yield 0.4 g., M.P. 242° C. (decomp.).

EXAMPLE 3

A dried *Achyranthis radix* was chopped into small pieces. Two kilograms of this material were immersed in 3 liters of water and left to stand overnight at room temperature (20–25° C.). Then the suspension was filtered and the residue was again extracted in the same manner with 2 liters of water and then filtered. The filtrates were combined and passed through a column (300 ml.) of a strong acidic cation exchange resin, i.e. Amberlite IR–120 (H type). The column was washed with 1 liter of water. The washing water and solution passed through the resin column were combined and the mixture was passed through a column (300 ml.) of a strong basic anion exchange resin, i.e. Amberlite IRA–410 (OH type). The column was washed with 1 liter of water. The washing water and solution passed through the resin column were combined. The mixture was concentrated by evaporation in vacuo to obtain 200 g. of a neutral concentrate, which was then subjected to repeated extraction with ethyl acetate (total 1 liter). The extract was distilled to remove the solvent and crude crystals were precipitated in the residue. The crude crystals were recovered by filtration. The filtrate was adsorbed on an alumina column, eluted with an ethyl acetate-ethyl alcohol mixture and concentrated to obtain further crude crystals in the same manner as in Example 1. In this way there was obtained 0.4 g. in total of crude crystals of inokosterone and iso-inokosterone. These crude crystals were treated in the same manner as in Example 2 to obtain 0.1 g. of crystalline inokosterone (M.P. 255° C., decomp.) and 0.1 g. of crystalline iso-inokosterone (MP. 242° C., decomp).

EXAMPLE 4

Herb of Achyrantes fauriei were air-dried and chopped into small pieces. Twenty-eight kilograms of this material were dipped in 200 liters of methyl alcohol and refluxed for 6 hours. After cooling the suspension was filtered and the residue was extracted twice with each 150 liters of methyl alcohol for 6 hours. After each extraction cooled suspension was filtered. The filtrates were combined and concentrated by evaporation in vacuo to obtain 3.8 kg. of concentrate. To this concentrate were added 4 liters of water and solid impurities were removed by filtration. The filtrate was extracted three times with ether (total 3 liters). The aqueous layer of the extract was recovered and repeatedly extracted with ethyl acetate (total 35 liters). The extract was distilled to remove the solvent and the residue was dissolved in 50 ml. of ethyl alcohol. The solution was adsorbed on an upper portion of a column (500 g.) of alumina. Then the column was subjected to elution with 2.5 liters of a mixture (8:2) of ethyl acetate and ethyl alcohol. The effluent was distilled to remove the solvent and there were obtained 9 g. of crude crystals. The crude crystals were treated in the same manner as in Example 1 to obtain 2.8 g. of crystalline inokosterone (M.P. 255° C., decomp.) and 2.0 g. of crystalline iso-inokosterone (MP. 242° C., decomp).

The inokosterone and iso-inokosterone obtained by the method of this invention showed a very strong activity in moulting tests made by using isolated abdomens of such fly larvae as *Sarcophaga crassipalpis, Sarcophaga peregrina, Phormia regina* and *Chrysomyia megacephala.*

It has been confirmed by Dr. H. Hoffmeister of I. Medizinische Universitätsklinik Eppedorf und Chemisches Staatsinstitut, Hamburg, Germany that the iso-inokosterone is identified as ecdysterone in all of the chemical color reaction, spectrographic and chromatographic behaviors.

The chemical and physical characteristics of inokosterone and iso-inokosterone are as follows:

Inokosterone

Chemical formula:

Colorless needle crystals; M.P. 255° C. (decomp.);

$[\alpha]_D^{27}+59.4°$ (C=0.78, MeOH); IR(KBr)cm.$^{-1}$ 3.400, 1.645;

UV $\lambda_{max.}^{EtOH}$ m$\mu$ 243

Iso-inokosterone (Ecdysterone)

Chemical formula:

Colorless needle crystals; M.P. 242° C. (decomp.);

$[\alpha]_D^{28}+63°$ (C=1.0, MeOH); IR(KBr)cm.$^{-1}$ 3.370, 1.650;

UV $\lambda_{max.}^{EtOH}$ m$\mu$ 243

Finally, NMR data (in pyridine, p.p.m., TMS) of inokosterone, iso-inokosterone and ecdysterone (which has been found to be identical with iso-inokosterone) and other related known compounds are as follows:

| Substance | C-18 | C-19 | C-21 | C-26, C-27 |
|---|---|---|---|---|
| Ecdysone | 0.69 | 1.04 | 1.24 | 1.35 |
| Ecdysterone | 1.19 | 1.06 | 1.55 | 1.34 |
| Inokosterone | 1.19 | 1.07 | 1.52 | 0.99 D, 1.07 C-27 |
| Iso-inokosterone | 1.20 | 1.07 | 1.57 | 1.37 |

What is claimed is:

1. A method for the recovery of inokosterone and/or iso-inokosterone which comprises subjecting plant material from a plant of the Amaranthaceae family to solvent extraction by means of solvent for the said inokosterone and/or iso-inokosterone in an amount of about 1 to 40 parts by weight of solvent per part by weight of plant material.

2. A method according to claim 1, wherein the solvent amounts to about 2 to 10 parts by weight per part by weight of plant material.

3. A method according to claim 2, and severally recovering inokosterone and/or iso-inokosterone from the obtained extract.

4. A method according to claim 1, wherein the plant is of the Achyranthes genus.

5. A method according to claim 4, wherein the plant material is any portion of *Achyranthes fauriei.*

6. A method according to claim 4, wherein the plant material is any portion of *Achyranthes longifolia.*

7. A method according to claim 4, wherein the plant material is any portion of *Achyranthes japonica.*

8. A method according to claim 4, wherein the plant material is any portion of *Achyranthes bidentata.*

9. A method according to claim 4, wherein the plant material is any portion of *Achyranthes aspera.*

10. A method according to claim 4, wherein the plant material is any portion of *Achyranthes obutusifolia.*

11. A method according to claim 4, wherein the plant material is any portion of *Achyranthes rubrofusca.*

12. A method according to claim 1, wherein the plant is of the Cyathula genus.

13. A method according to claim 12, wherein the plant material is any portion of *Cyathula capitata.*

14. A method according to claim 12, wherein the plant material is any portion of *Cyathula tomentosa.*

No references cited.

ELBERT L. ROBERTS, *Primary Examiner.*

U.S. Cl. X.R.

260—999